(12) United States Patent
Rauch

(10) Patent No.: US 11,852,523 B2
(45) Date of Patent: Dec. 26, 2023

(54) OPTICAL SENSOR HAVING DIRECTIONAL SENSITIVITY

(71) Applicant: ams AG, Premstaetten (AT)

(72) Inventor: Werner Rauch, Eindhoven (NL)

(73) Assignee: AMS AG, Premstaetten (AT)

( * ) Notice: Subject to any disclaimer, the term of this patent is extended or adjusted under 35 U.S.C. 154(b) by 0 days.

(21) Appl. No.: 17/598,054

(22) PCT Filed: Mar. 26, 2020

(86) PCT No.: PCT/EP2020/058624
§ 371 (c)(1),
(2) Date: Sep. 24, 2021

(87) PCT Pub. No.: WO2020/193733
PCT Pub. Date: Oct. 1, 2020

(65) Prior Publication Data
US 2022/0163380 A1  May 26, 2022

Related U.S. Application Data

(60) Provisional application No. 62/825,521, filed on Mar. 28, 2019.

(51) Int. Cl.
*G01J 1/02* (2006.01)
*G01J 1/04* (2006.01)
*G01J 1/42* (2006.01)
*G01J 1/06* (2006.01)

(52) U.S. Cl.
CPC .......... *G01J 1/0266* (2013.01); *G01J 1/0209* (2013.01); *G01J 1/0242* (2013.01); *G01J 1/0437* (2013.01); *G01J 1/06* (2013.01); *G01J 1/4204* (2013.01); *G01J 1/4228* (2013.01)

(58) Field of Classification Search
CPC ...... G01J 1/0266; G01J 1/0209; G01J 1/0437; G01J 1/4204; G01J 1/4228; G01J 1/0219; G01J 1/0242; G01J 1/06; G01J 1/0233
See application file for complete search history.

(56) References Cited

U.S. PATENT DOCUMENTS

| | | | | |
|---|---|---|---|---|
| 5,196,689 A | * | 3/1993 | Sugita | G01S 11/12 250/221 |
| 2010/0283998 A1 | * | 11/2010 | Souchkov | G01J 1/0228 356/141.2 |
| 2012/0293472 A1 | * | 11/2012 | Wong | G01J 1/4204 250/208.6 |

(Continued)

OTHER PUBLICATIONS

International Search Report and Written Opinion dated Jun. 16, 2020 for corresponding International Application No. PCT/EP2020/058624.

(Continued)

*Primary Examiner* — Jennifer D Bennett
(74) *Attorney, Agent, or Firm* — Tarolli, Sundheim, Covell & Tummino, LLP

(57) ABSTRACT

An apparatus includes a light senor having directional sensitivity. The light sensor includes multiple light sensitive elements disposed below the same aperture. Each of the light sensitive elements has a respective field of view through the aperture that differs from the field of view of the other light sensitive elements. Signals from the light sensor can facilitate determining the direction of incoming light.

15 Claims, 2 Drawing Sheets

(56) References Cited

U.S. PATENT DOCUMENTS

| | | | |
|---|---|---|---|
| 2013/0100096 A1* | 4/2013 | Webster | G09G 3/3466 345/207 |
| 2014/0167619 A1 | 6/2014 | Land | |
| 2014/0264700 A1* | 9/2014 | Janson | G01J 1/0266 438/69 |
| 2014/0268116 A1* | 9/2014 | Fant | G01J 1/4204 356/226 |
| 2015/0169086 A1 | 6/2015 | Wojtczuk | |
| 2016/0054175 A1 | 2/2016 | Jia | |
| 2017/0097413 A1* | 4/2017 | Gillian | G01S 7/4004 |
| 2017/0176575 A1* | 6/2017 | Smits | G01S 7/4808 |

OTHER PUBLICATIONS

CN Office Action for CN Patent Application No. 202080025641.6, dated Oct. 12, 2023, with English Translation, pp. 1-15.

* cited by examiner

OPTICAL SENSOR HAVING DIRECTIONAL SENSITIVITY

RELATED APPLICATIONS

The present invention is a U.S. National Stage under 35 USC 371 patent application, claiming priority to Serial No. PCT/EP2020/058624, filed on 26 Mar. 2020; which claims priority from U.S. Provisional Application No. 62/825,521 filed 28 Mar. 2019, the entirety of both of which are incorporated herein by reference.

FIELD OF THE DISCLOSURE

This disclosure relates to optical sensors having directional sensitivity.

BACKGROUND

Various consumer electronic products such as smart phones and other portable host computing devices include compact optoelectronic modules that have integrated light sensing and/or light emitting devices. Some of these modules are configured to determine the direction from which a light signal is received.

SUMMARY

The present disclosure describes an apparatus that includes a light senor having directional sensitivity. The light sensor includes multiple light sensitive elements disposed below the same aperture. Each of the light sensitive elements has a respective field of view through the aperture that differs from the field of view of the other light sensitive elements.

In some implementations, the apparatus also includes an electronic control unit operable to determine a direction of received light based on output signals from one or more of the light sensitive elements and based on the respective fields of view of the light sensitive elements.

In some cases, the light sensitive elements are disposed across an area larger than a cross-sectional area of the aperture. The light sensitive elements can be implemented, for example, as pinned diodes, although types of photodetectors can be used as well. In some implementations, the light sensitive elements form a two-dimensional array of photodetectors.

In some instances, at least some of the respective fields of view of the light sensitive elements partially overlap one another.

The light sensitive elements may be formed, for example, in a semiconductor substrate, and the apparatus can include at least one metal layer having an opening that defines a size of the aperture. In other implementations, a black mask filter or other layer has an opening that defines the size of the aperture.

The light sensor can be disposed, for example, in a portable host computing device (e.g., a smartphone, tablet, wearable device, personal digital assistant (PDA), or personal computer). Depending on the application, the electronic control unit can be operable to use information about the determined detection in conjunction with gesture recognition, proximity sensing, ambient light sensing, color sensing, and/or time-of-flight (TOF) sensing. In some instance, the electronic control unit is operable to process the signals from the light sensitive elements to determine whether the received light is diffuse or whether the received light is coming from more than one source.

In some implementations, the optical sensor can be ultra-small and can achieve improved directional sensitivity at a relatively low manufacturing cost.

Other aspects, features and advantages will be readily apparent from the following detailed description, the accompanying drawings, and the claims.

DETAILED DESCRIPTION

In general, an optoelectronic module as described in this disclosure has a light sensor, and also may include an illumination source, each of which may be implemented, for example, in a respective die (e.g., an integrated circuit semiconductor chip). In some instances, light produced by the illumination source is emitted from the module toward an object that reflects a portion of the light back toward the module where it may be detected at the light receiver. In some instances (e.g., for gesture recognition), it is desirable to be able to detect the direction from which the light detected in the module is received.

Figure 1:
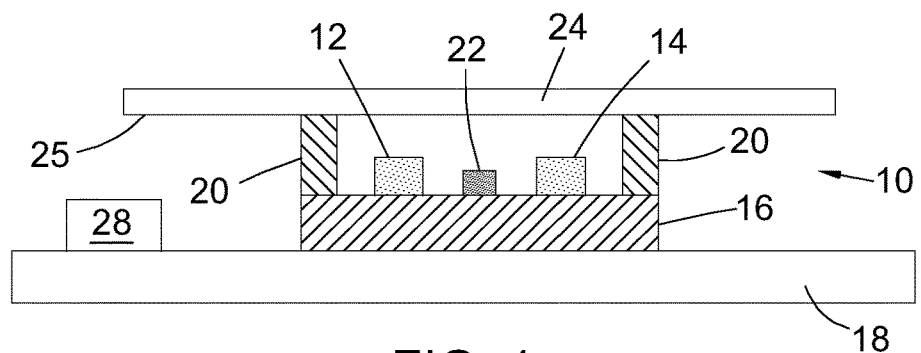
FIG. 1 shows an example of a sensor module.

FIG. 1 illustrates an example of a sensor module 10 that includes an illumination source 12 operable to produce light, and a light sensor 14 operable to sense light of a wavelength (e.g., infra-red (IR), near IR, visible or ultraviolet (UV)) produced by the illumination source 12. The illumination source can include one or more light emitters, examples of which include light emitting diodes (LEDs), infra-red (IR) LEDs, organic LEDs (OLEDs), infra-red (IR) laser diodes, vertical cavity surface emitting lasers (VCSELs)) and arrays of such devices. In some cases, the module includes passive optical components to redirect light by refraction and/or diffraction and/or reflection (e.g., a lens, a prism, a mirror). The dies for the illumination source 12 and light sensor 14 can be mounted and electrically coupled to a printed circuit board (PCB) 18 of a host device (e.g., a portable computing device such as a smartphone, tablet, wearable device, personal digital assistant (PDA), or personal computer). The electrical connections may be include one or more of die pads, surface mount connections, wire bonds or solder balls, depending on the implementation.

In the illustrated example, the illumination source 12 and light sensor 14 are surrounded laterally by a spacer or housing wall 20 that, in some cases, is opaque to the wavelength(s) produced by the illumination source 12 and sensed by the light sensor 14. An interior wall 22 can separate the illumination source 12 and light sensor 14 from one another, which can help reduce internal optical crosstalk. In some implementations, the interior wall 22 may not be present. The module 10 can be disposed, for example, behind the backside 25 of a cover glass 24 of the host device.

Figure 2:
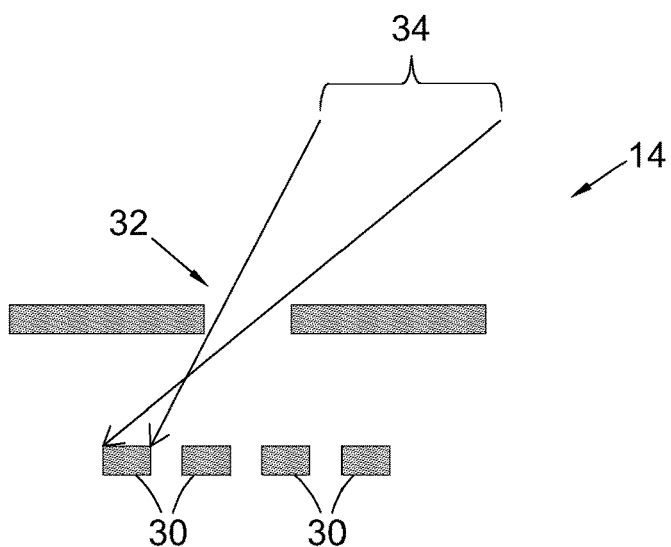
FIG. 2 is a schematic side view of a light sensor.
Figure 3:
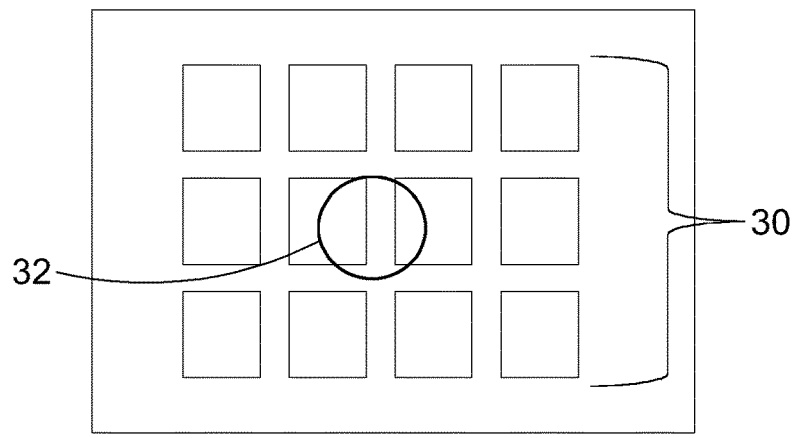
FIG. 3 is a schematic top view of the light sensor.

To provide directional sensitivity, the light sensor 14 includes multiple light sensitive elements (i.e., two or more) disposed below the same aperture such that each of the optically sensitive elements has a field of view (FOV) that differs from the FOV of the other optically sensitive elements. FIGS. 2 and 3 illustrate an example, discussed in greater detail below.

As shown in FIGS. 2 and 3, the light sensor 14 includes multiple light sensitive elements 30 (i.e., two or more) disposed below the same aperture 32. The light sensitive elements 30 can be implemented, for example, as pinned diodes, photodiodes, single-photon avalanche diodes (SPADs), or other light detecting devices. In some instances, pinned diodes are particularly advantageous because of their small size. For example, for some mobile camera sensors, the pixel size may be about 1.1 µm×1.1 nm. Different sizes, including smaller pinned diodes (e.g., 0.2µ×0.2 nm), can be used in other implementations. The light sensitive elements 30 can be arranged, for example, as an M×N array (where each of M and N is greater than 1) or as a linear array. FIG. 3, for example, shows a 3×4 array of light sensitive elements 30, although size arrays can be used as well. In other cases, the light sensitive elements 30 can be arranged in some other configuration.

Collectively, the light sensitive elements 30 should be disposed across an area (i.e., in a plane parallel to the plane of the substrate 18) larger than the cross-sectional area of the aperture 32 (see, e.g., FIG. 3). In this way, each light sensitive element 30 has a FOV that differs from the FOV of the other light sensitive elements. FIG. 2 shows the FOV 34 for one of the light sensitive elements 30. Although the respective FOVs of the light sensitive elements 30 differ from one another, they may overlap partially.

Figure 4:
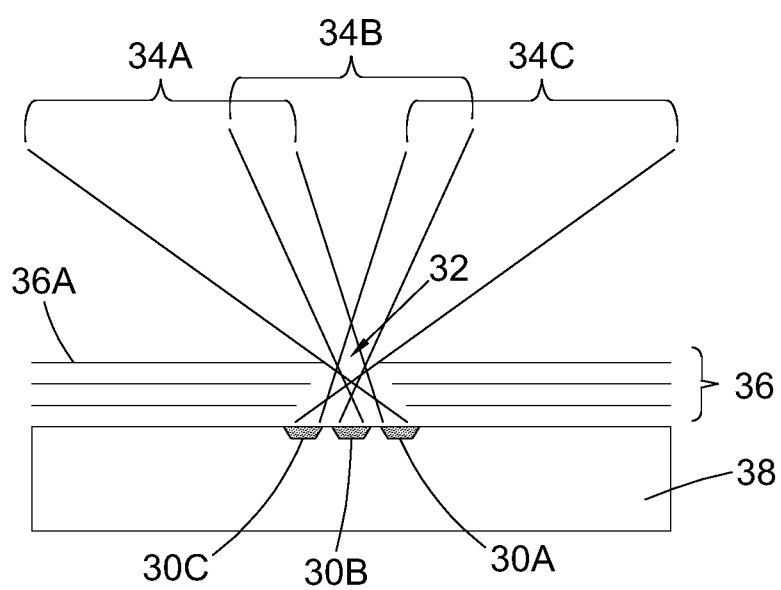
FIG. 4 illustrates further details of the light sensor according to a particular implementation.

As illustrated in FIG. 4, the aperture 32 can be defined by depositing one or more metal layers 36 directly on the semiconductor (e.g., silicon) substrate in which the light sensitive elements are formed. FIG. 4 illustrates the respective FOV 34A, 34B, 34C for each of three light sensitive elements 30A, 30B, 30C. In the illustrated example, the top metal layer 36A has an opening that defines the size of the aperture 32. In some instances, the distance between the photosensitive silicon surface and the top metal layer 36A is about 1 nm. Different values may be appropriate for other implementations. One advantage of forming the aperture by a stack of one or more metal layers is that it allows the aperture to be formed using standard CMOS processes. Nevertheless, in some implementations, the aperture can be formed in other ways. For example, the aperture 32 can be defined by a small opening in a black mask filter (e.g., if the distance to the light sensitive elements is relatively large such as in the range of 5-10 nm). In other implementations, the aperture 32 can be defined using some other layer that can block incoming light (e.g., a white or reflecting filter).

The signal(s) sensed by the light sensor 14 can be read out and processed by an electronic control unit (ECU) 28 (see FIG. 1) either in the sensor module 10 itself or in the host device in which the module is disposed. The ECU 28 can be implemented, for example, as an integrated circuit chip or other processor and may include software stored in memory. The ECU 28 may include appropriate logic and/or other hardware components (e.g., read-out registers; amplifiers; analog-to-digital converters; clock drivers; timing logic; signal processing circuitry; and/or microprocessor). In some cases, the ECU 28 (or part of it) can be integrated into the same IC chip as the light sensor 22.

The ECU 28 is operable, among other things, to determine a direction from which the detected light was received in the module 10. This can be accomplished, for example, by identifying which of the light sensitive elements 30 generated the largest output signal (e.g., after accounting for noise or optical cross-talk) and using that information together with stored information about the FOV for the particular light sensitive element 30 to identify the direction of the incoming light. In some cases, more than one of the light sensitive elements 30 may detect a signal during the same period. The ECU 28 then can analyze the signals output by the light sensitive elements 30 based, for example, on the relative amplitudes of the signals and to use that information, together with the stored knowledge of the FOVs for the light sensitive elements, to estimate the direction from which the detected light was received. In some instances, the ECU 28 is operable to process the signals from the light sensitive elements 30 to determine whether the light is diffuse or coming from one or more sources (e.g., spotlights).

Knowledge of the direction from which the light is received can increase the information available to the ECU 28 about the detected light. Such knowledge can be used in a range of different applications including, for example, gesture recognition, proximity sensing, ambient light sensing, color sensing and time-of-flight (TOF) and distance sensing.

Gesture recognition, for example, has become prominent in portable and wearable devices in the gaming, healthcare, automation, automotive and consumer electronics sectors. In the context of gesture recognition, the ECU 28 can provide a perceptual computing user interface that allows the device to capture and interpret human gestures as commands in a contactless manner. For example, the ECU 28 can use the directional information obtained from the light sensitive element output signals, together with other information, to determine the physical motion of the user's finger or hand. The techniques described above for the light sensor 14 can, in some cases, facilitate an ultra-low cost solution that does not require optical lenses or special packaging. The small size can be particularly suited, for example, for earbuds, where gesture sensors can be used to control the sound (e.g., loudness, mute, or switch off) without requiring the user to touch the device.

In the context of proximity sensors, knowing the direction from which the detected light is coming can, in some instances, help distinguish which portions of the received light come from crosstalk, reflections from the host device' cover glass or a smudge on the cove glass, or from a target in front of the host device In the context of ambient light sensors, knowing the direction from which the detected light is coming can, in some cases, help determine how strong reflections may be and to what extent the ambient light may tend to blind the user of the host device. The ECU 28 can be configured with an intelligent algorithm to adjust, for example, the brightness of the host devices' display screen based on the ambient light conditions.

In the context of color sensors (e.g., red, green, blue and clear), knowing the direction from which the detected light is coming can, in some cases, help the ECU 28 estimate the color temperature of the light coming from different directions. For near-perfect white balance, a detailed knowledge about the light conditions can provide a significant advantage. Such knowledge might indicate, for example, that there is diffuse light or strong light on one side.

In the context of TOF sensors, knowing the direction from which the detected light is coming can, in some cases, allow the sensor to identify the targets in different directions, which can facilitate an ultra-low cost, multi-zone sensor in which lenses are not required.

The foregoing types of sensors can be integrated, for example into a smartphone or other portable host computing device (e.g., tablet, wearable device, personal digital assistant (PDA), or personal computer). The design of such devices referenced can include one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, a T-1 internet connection, etc.).

Various aspects of the subject matter and the functional operations described in this specification (e.g., those related to the circuitry 28) can be implemented in digital electronic circuitry, or in computer software, firmware, or hardware, including the structures disclosed in this specification and their structural equivalents, or in combinations of one or more of them. Thus, aspects of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The apparatus can include, in addition to hardware, code that creates an execution environment for the computer program in question, e.g., code that constitutes processor firmware.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

A number of implementations have been described. Nevertheless, various modifications may be made without departing from the spirit and scope of the invention. Accordingly, other implementations are within the scope of the claims.

The invention claimed is:

1. An apparatus comprising:
a light sensor having directional sensitivity, the light sensor including a plurality of light sensitive elements disposed on a substrate;
a plurality of metal layers deposited on the substrate and having openings that define a size of a single aperture, at least one metal layer having an opening that is larger than an opening of another metal layer of the plurality of metal layers disposed on the at least one metal layer,
wherein the plurality of light sensitive elements are disposed below the single aperture, and
wherein each of the light sensitive elements has a respective field of view through the single aperture that differs from the field of view of the other light sensitive elements.

2. The apparatus of claim 1 further including an electronic control unit operable to determine a direction of received light based on output signals from one or more of the light sensitive elements and based on the respective fields of view of the light sensitive elements.

3. The apparatus of claim 1 wherein the light sensitive elements are disposed collectively across an area larger than a cross-sectional area of the single aperture.

4. The apparatus of claim 1 wherein the light sensitive elements comprise pinned diodes.

5. The apparatus of claim 1 wherein at least some of the respective fields of view of the light sensitive elements partially overlap one another.

6. The apparatus of claim 1 wherein the plurality of light sensitive elements is a two-dimensional array of photodetectors.

7. The apparatus of claim 1 wherein the light sensor is disposed in a portable host computing device.

8. The apparatus of claim 2 wherein the electronic control unit is operable to use information about the determined detection in conjunction with gesture recognition.

9. The apparatus of claim 2 wherein the electronic control unit is operable to use information about the determined detection in conjunction with proximity sensing.

10. The apparatus of claim 2 wherein the electronic control unit is operable to use information about the determined detection in conjunction with ambient light sensing.

11. The apparatus of claim 2 wherein the electronic control unit is operable to use information about the determined detection in conjunction with color sensing.

12. The apparatus of claim 2 wherein the electronic control unit is operable to use information about the determined detection in conjunction with time-of-flight (TOF) sensing.

13. The apparatus of claim 2 wherein the electronic control unit is operable to process the signals from the light sensitive elements to determine whether the received light is diffuse.

14. The apparatus of claim 2 wherein the electronic control unit is operable to process the signals from the light sensitive elements to determine whether the received light is coming from more than one source.

15. An apparatus comprising:
a light sensor having directional sensitivity, the light sensor including an array of pinned diodes disposed on a substrate;
a plurality of metal layers deposited on the substrate and having openings that define a size of a single aperture, at least one metal layer having an opening that is larger than an opening of another metal layer of the plurality of metal layers disposed on the at least one metal layer; and
an electronic control unit operable to determine a direction of received light based on output signals from one or more of the pinned diodes and based on the respective fields of view of the pinned diodes,
wherein each of the pinned diodes are disposed below the single aperture and have a respective field of view through the single aperture that differs from the field of view of the other pinned diodes, and
wherein the pinned diodes collectively are disposed across an area larger than a cross-sectional area of the single aperture.

\* \* \* \* \*